United States Patent
Choi

(10) Patent No.: US 9,396,149 B2
(45) Date of Patent: Jul. 19, 2016

(54) PCIE SWITCH APPARATUS AND METHOD OF CONTROLLING CONNECTION THEREOF

(71) Applicant: Electronics and Telecommunications Research Institute, Daejeon (KR)

(72) Inventor: Yong-Seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 582 days.

(21) Appl. No.: 13/837,566

(22) Filed: Mar. 15, 2013

(65) Prior Publication Data

US 2013/0268713 A1 Oct. 10, 2013

(30) Foreign Application Priority Data

Apr. 5, 2012 (KR) ........................ 10-2012-0035715

(51) Int. Cl.
*G06F 13/20* (2006.01)
*G06F 13/40* (2006.01)

(52) U.S. Cl.
CPC .................................. *G06F 13/4022* (2013.01)

(58) Field of Classification Search
CPC .................. G06F 13/4045; G06F 13/4022
USPC ................... 710/313–314, 305–306, 316–317
See application file for complete search history.

(56) References Cited

U.S. PATENT DOCUMENTS

| | | | | |
|---|---|---|---|---|
| 8,463,881 B1* | 6/2013 | Baker | ................ | G06F 13/4027 709/220 |
| 2010/0070673 A1* | 3/2010 | Jung | .................. | G06F 13/4045 710/313 |
| 2010/0329285 A1* | 12/2010 | Stanton | .............. | H04L 67/1095 370/503 |
| 2013/0011142 A1* | 1/2013 | Goodson | ............ | H04Q 11/0067 398/98 |
| 2013/0219103 A1* | 8/2013 | Stark | ....................... | G06F 13/14 710/317 |
| 2014/0208403 A1* | 7/2014 | Lu | ........................ | H04L 63/0838 726/6 |

\* cited by examiner

*Primary Examiner* — Tim T Vo
*Assistant Examiner* — Kim T. Huynh
(74) *Attorney, Agent, or Firm* — Staas & Halsey LLP

(57) ABSTRACT

The present invention relates to a PCIe switch apparatus and a method of controlling the connection thereof. The PCIe switch apparatus includes a PCIe photoconversion unit for converting an electrical signal input from a local host into packet data and converting the converted packet data into an optical signal. A PCIe slot board unit reconverts the optical signal into the packet data, reconverts the packet data into the electrical signal, and outputs the electrical signal to a PCIe-based device. An optical cable connects the PCIe photoconversion unit and the PCIe slot board unit to each other. The PCIe switch apparatus controls a long-distance communication interface between the local host and the PCIe-based device.

5 Claims, 7 Drawing Sheets

PCIE SWITCH APPARATUS AND METHOD OF CONTROLLING CONNECTION THEREOF

CROSS REFERENCE TO RELATED ED APPLICATION

This application claims the benefit of Korean Patent Application No. 10-2012-0035715, filed on Apr. 5, 2012, which is hereby incorporated by reference in its entirety into this application.

BACKGROUND OF THE INVENTION

1. Technical Field

The present invention relates generally to a Peripheral Component Interconnect Express (PCIe) switch apparatus and a method of controlling the connection thereof and, more particularly, to a PCIe switch apparatus and a method of controlling the connection thereof, which enable conversion between an electrical signal and an optical signal to be performed within the PCIe switch apparatus so as to control a long-distance communication interface between a local host and a PCIe-based device.

2. Description of the Related Art

Generally, methods of connecting to a PCIe-based device over a long distance include a method of extending a connection range using a PCIe cable, a method of respectively exploiting PCIe switches for local and remote devices and connecting PCIe signals between the PCIe switches to each other using an optical medium, and a method of directly converting PCIe signals generated by a local device into optical signals and connecting the optical signals over a long distance.

The method using the PCIe cable is limited in a connection distance and in an operating speed because of the use of electrical signals, and is also disadvantageous in that packets may be lost due to the attenuation of signals. Further, the method of exploiting PCIe switches for local and remote devices is disadvantageous in that resources are wasted and a delay time is increased because of the use of unnecessary duplicate PCIe switches. Furthermore, the method of directly converting PCIe signals into optical signals and connecting the optical signals over a long distance is disadvantageous because it is impossible to achieve protocol standards, such as the sensing of a receiver using electrical signals and the change in the level of electrical signals, which are required by PCIe protocols.

FIG. 1 is a diagram showing the configuration of a PCIe connection apparatus using the PCIe cable extension technology among the above-described conventional technologies. Referring to FIG. 1, a PCIe slot connector present in a PCIe cable extension card 20 is connected to a PCIe slot connector present in a local host 10, such as a server or a Personal Computer (PC). In this case, signals present in the PCIe slot connector are converted by a PCIe signal converter 21 for conversion between the PCIe slot connector signals and cable signals so that the PCIe slot connector signals meet PCIe cable standards. In a remote place, a PCIe slot extension board 30 must be provided in order to connect to a PCIe-based device 40. In the PCIe slot extension board 30, a PCIe signal converter 31 for conversion between PCIe slot connector signals and cable signals is present to provide signal matching therebetween. A problem with a PCIe interface apparatus having this configuration is that electrical signals are used without being changed, so that the problem of signal attenuation cannot be overcome when a large number of signals are used, there is interference between signals, and the cable is extended over a long distance. Further, the distance of the signal connection is limited to 1 to 1.5 m, and the thickness of the cable for remotely connecting signals also acts as a non-negligible factor interfering with extending over a long distance. Therefore, the efficiency of signal transmission is deteriorated, so that an effective counter plan for improving signal transmission efficiency is required.

SUMMARY OF THE INVENTION

Accordingly, the present invention has been made keeping in mind the above problems occurring in the prior art, and an object of the present invention is to provide a PCIe switch apparatus and a method of controlling the connection thereof, which enable conversion between an electrical signal and an optical signal to be performed within the PCIe switch apparatus so as to control a connection between a local host and a PCIe-based device, thus enabling connection control, such as for the sensing of a receiver and the change of a signal level that are required by PCIe protocol standards, to be implemented.

Another object of the present invention is to provide a PCIe switch apparatus and a method of controlling the connection thereof, which prevent duplicate PCIe switches from being used, thus minimizing a waste of resources and eliminating a delay time.

In accordance with an aspect of the present invention to accomplish the above objects, there is provided a Peripheral Component Interconnect Express (PCIe) switch apparatus, including a PCIe photoconversion unit for converting an electrical signal input from a local host into packet data and converting the converted packet data into an optical signal; a PCIe slot board unit for reconverting the optical signal into the packet data, reconverting the packet data into the electrical signal, and outputting the electrical signal to a PCIe-based device; and an optical cable for connecting the PCIe photoconversion unit and the PCIe slot board unit to each other, wherein the PCIe switch apparatus controls a long-distance communication interface between the local host and the PCIe-based device.

Preferably, the PCIe photoconversion unit may include a PCIe slot male connector coupled to a PCIe slot female connector of the local host, and is then connected to the local host.

Preferably, the PCIe photoconversion unit may include a PCIe upstream bridge for converting the input electrical signal into packet data conforming to PCIe protocol standards; and an electro-optical converter for converting the packet data into the optical signal.

Preferably, the PCIe upstream bridge may include a first data transmission unit configured to transmit the packet data; a first packet integrity processing unit configured to verify integrity of the packet data; a first data serialization unit configured to convert the packet data, integrity of which has been verified, into a serial signal; an electro-optical converter interface unit connected to the electro-optical converter and configured to transmit the packet data that has been converted into the serial signal; and a first data parallelization unit configured to convert the packet data that has been converted into the serial signal into a parallel signal.

Preferably, the first data transmission unit may include a physical layer for transmitting the electrical signal in a format of the packet data conforming to the PCIe protocol standards, and a data link layer for checking integrity of packet data received from a transaction layer.

Preferably, the PCIe photoconversion unit may include a first optical cable connector and is then connected to the optical cable.

Preferably, the PCIe slot board unit may include a second optical cable connector and is then connected to the optical cable.

Preferably, the PCIe slot board unit may include a photoelectric converter for reconverting the converted optical signal into the electrical signal; and a PCIe downstream bridge for converting the reconverted electrical signal into the packet data conforming to PCIe protocol standards.

Preferably, the PCIe downstream bridge may include a photoelectric converter interface unit connected to the photoelectric converter and configured to transmit the packet data corresponding to the reconverted electrical signal; a second data parallelization unit configured to convert the packet data corresponding to the reconverted electrical signal into a parallel signal; a second packet integrity processing unit configured to verify integrity of the packet data corresponding to the reconverted electrical signal; a second data transmission unit configured to transmit the packet data corresponding to the reconverted electrical signal; and a second data serialization unit configured to convert the packet data that has been converted into the parallel signal into a serial signal.

Preferably, the second data transmission unit may be implemented using a data link layer for adding Cyclic Redundancy Check (CRC) and sequence information to the packet data, integrity of which has been guaranteed and which has been received from a transaction layer, and then transmitting resulting packet data to a physical layer.

Preferably, the PCIe slot board unit may include a PCIe slot interface coupled to a PCIe slot male connector of the PCIe-based device and is then connected to the PCIe-based device.

In accordance with another aspect of the present invention to accomplish the above objects, there is provided a method of controlling a connection of a Peripheral Component Interconnect Express (PCIe) switch apparatus, including a PCIe photoconversion unit, provided in the PCIe switch apparatus, converting an electrical signal input from a local host into packet data and converting the packet data into an optical signal; and a PCIe slot board unit, connected to the PCIe photoconversion unit via an optical cable, reconverting the optical signal into the packet data, reconverting the packet data into the electrical signal, and outputting the electrical signal to a PCIe-based device, wherein the method controls a communication interface between the local host and the PCIe-based device.

Preferably, the converting the packet data into the optical signal may be configured such that the PCIe photoconversion unit converts the input electrical signal into packet data conforming to PCIe protocol standards by using a PCIe upstream bridge and converts the packet data into the optical signal by using an electro-optical converter.

Preferably, the reconverting the packet data into the electrical signal and outputting the electrical signal to the PCIe-based device may be configured such that the PCIe slot board unit reconverts the converted optical signal into the electrical signal by using a photoelectric converter, and converts the reconverted electrical signal into packet data conforming to PCIe protocol standards by using a PCIe downstream bridge.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
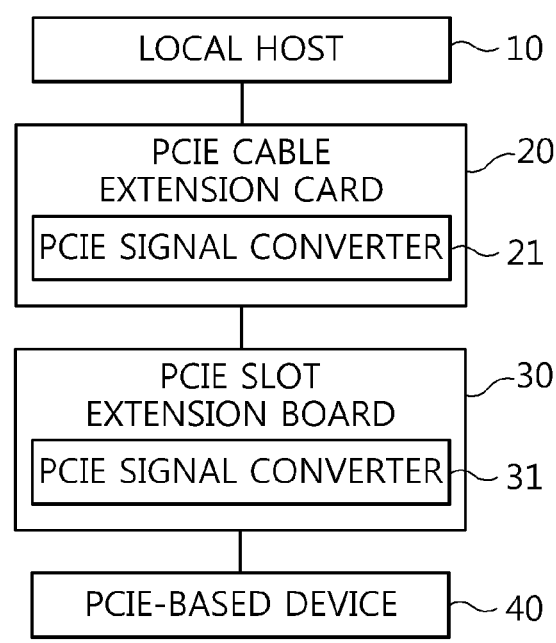
FIG. 1 is a block diagram showing the configuration of a PCIe connection apparatus using conventional PCIe cable extension technology.

Preferred embodiments of the present invention will be described in detail below with reference to the accompanying drawings to such an extent that those skilled in the art can easily implement the technical spirit of the present invention. Reference now should be made to the drawings, in which the same reference numerals are used throughout the different drawings to designate the same or similar components. In the following description, redundant descriptions and detailed descriptions of known elements or functions that may unnecessarily make the gist of the present invention obscure will be omitted.

Hereinafter, a Peripheral Component Interconnect Express (PCIe) switch apparatus and a method of controlling the connection thereof according to an embodiment of the present invention will be described in detail with reference to the attached drawings.

Figure 2:
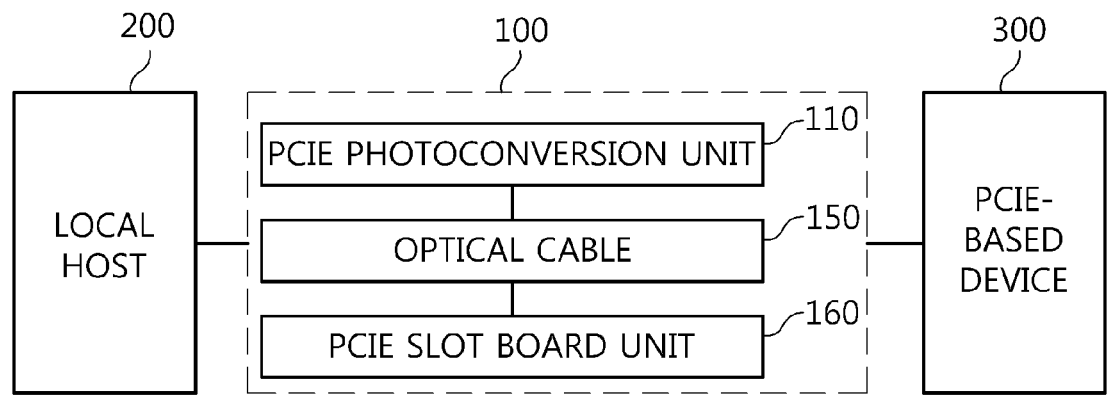
FIG. 2 is a block diagram showing the configuration of a PCIe switch apparatus according to an embodiment of the present invention.
Figure 3:
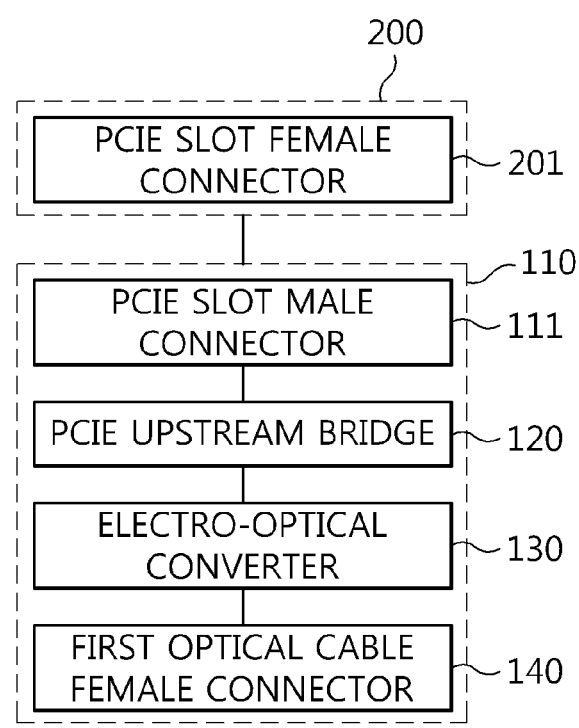
FIG. 3 is a block diagram showing the detailed configuration of a PCIe photoconversion unit employed in the PCIe switch apparatus according to an embodiment of the present invention.
Figure 4:
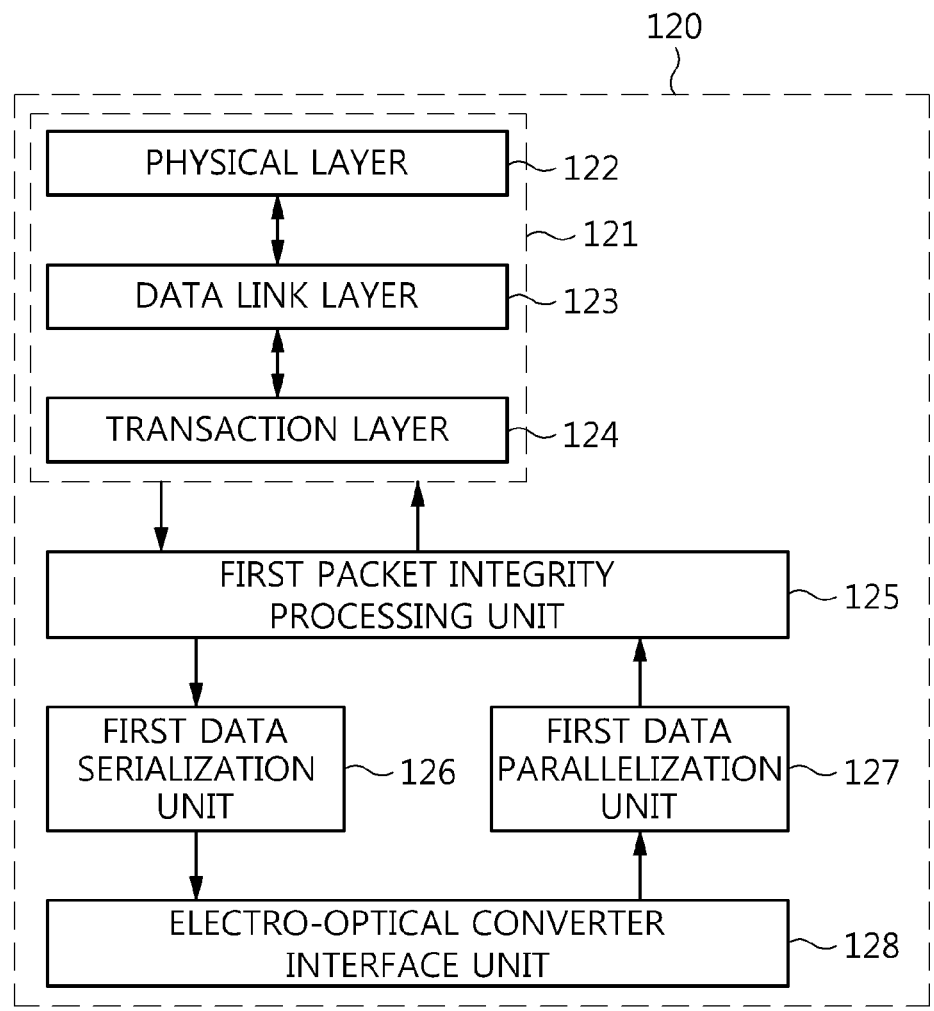
FIG. 4 is a block diagram showing the detailed configuration of a PCIe upstream bridge employed in the PCIe photoconversion unit.
Figure 5:
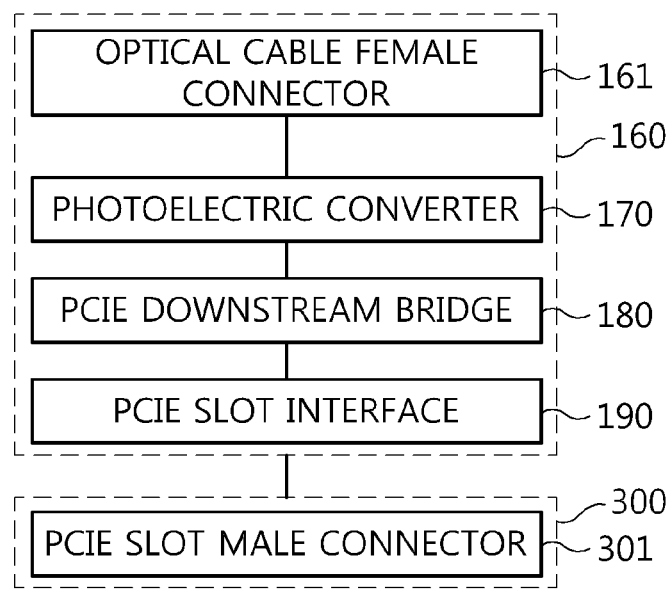
FIG. 5 is a block diagram showing the detailed configuration of a PCIe slot board unit employed in the PCIe switch apparatus according to an embodiment of the present invention.
Figure 6:
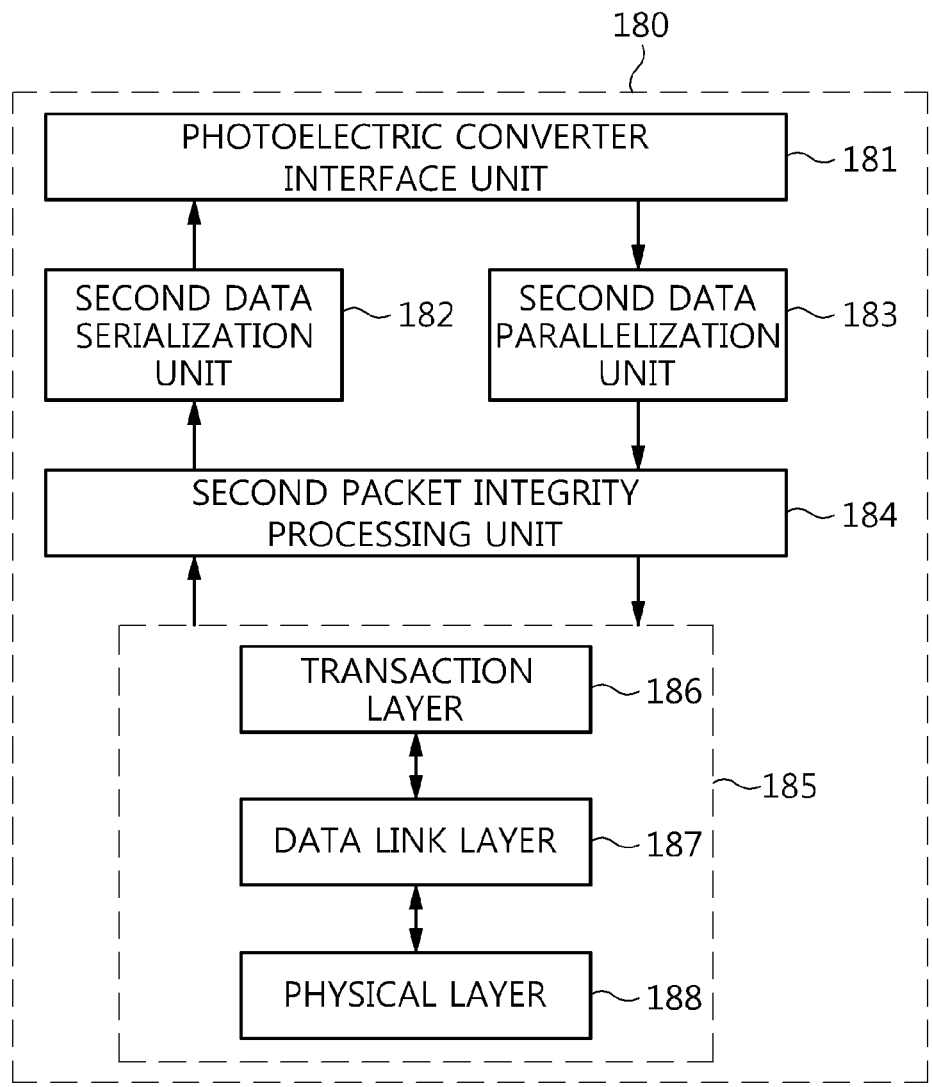
FIG. 6 is a block diagram showing the detailed configuration of a PCIe downstream bridge employed in the PCIe slot board unit.

FIG. 2 is a block diagram showing the configuration of a PCIe switch apparatus according to an embodiment of the present invention, FIG. 3 is a block diagram showing the detailed configuration of a PCIe photoconversion unit employed in the PCIe switch apparatus according to an embodiment of the present invention, FIG. 4 is a block diagram showing the detailed configuration of a PCIe upstream bridge employed in the PCIe photoconversion unit, FIG. 5 is a block diagram showing the detailed configuration of a PCIe slot board unit employed in the PCIe switch apparatus according to an embodiment of the present invention, and FIG. 6 is a block diagram showing the detailed configuration of a PCIe downstream bridge employed in the PCIe slot board unit.

Referring to FIG. 2, a PCIe switch apparatus 100 according to the present invention mainly includes a PCIe photoconversion unit 110, an optical cable 150, and a PCIe slot board unit 160, and controls a connection between a local host 200 and a PCIe-based device 300.

The PCIe photoconversion unit 110 converts an electrical signal input from the local host 200 into an optical signal. For this operation, as shown in FIG. 3, the PCIe photoconversion unit 110 includes a PCIe slot male connector 111, a PCIe upstream bridge 120, an electro-optical converter 130, and a first optical cable female connector 140.

The PCIe slot male connector 111 is coupled to the PCIe slot female connector of the local host 200, thus enabling the PCIe photoconversion unit 110 and the local host 200 to be mutually connected.

The PCIe upstream bridge 120 converts an input electrical signal into packet data conforming to PCIe protocol standards. As shown in FIG. 4, the PCIe upstream bridge 120 may include a first data transmission unit 121, a first packet integrity processing unit 125, a first data serialization unit 126, a first data parallelization unit 127, and an electro-optical converter interface unit 128.

The first data transmission unit 121 includes a physical layer 122 for transmitting an electrical signal in a format of packet data conforming to PCIe protocol standards, and a data link layer 123 for checking the integrity of packet data received from a transaction layer 124. The first packet integrity processing unit 125 guarantees the integrity of the packet data. The first data serialization unit 126 converts packet data, the integrity of which has been verified, into a serial signal. The electro-optical converter interface unit 128 is connected to the electro-optical converter 130 and is configured to transmit the packet data that has been converted into the serial signal. The first data parallelization unit 127 converts the packet data that has been converted into the serial signal into a parallel signal.

The PCIe upstream bridge 120 having the above configuration can transmit and receive signals suitable for electrical standards required by PCIe protocol standards by using the physical layer 122. The physical layer 122 receives packet data required by the data link layer 123, converts it into a format suitable for the data link layer 123, converts packet data received from the data link layer 123 into a format suitable for PCIe protocols, and transmits the resulting data to the local host 200. In this case, the data link layer 123 functions to check the integrity of the packet for the transaction layer 124 received from the physical layer 122, transmit the integrity-checked packet to the transaction layer 124, and add Cyclic Redundancy Check (CRC) and sequence information to the packet data for the transaction layer 124 received from the transaction layer 124 so that the integrity of the packet data can be checked by the local host 200. Further, the transaction layer 124 is connected not only to the data link layer 123, but also to the first packet integrity processing unit 125 for guaranteeing the integrity of packet data on the electro-optical converter interface unit 128, and performs a buffering function so as to simultaneously control both a flow on the data link layer 123 and a flow on the electro-optical converter interface unit 128. A serial signal is finally transmitted and received by the electro-optical converter interface unit 128 via the first data serialization unit 126 and the first data parallelization unit 127 disposed between the first packet integrity processing unit 125 and the electro-optical converter interface unit 128.

The electro-optical converter 130 converts the packet data into an optical signal.

The first optical cable connector 140 enables the optical cable 150 and the PCIe photoconversion unit 110 to be connected to each other.

The optical cable 150 connects the PCIe photoconversion unit 110 and the PCIe slot board unit 160 to each other. That is, one end of the optical cable 150 is connected to the first optical cable connector of the PCIe photoconversion unit 110, and the other end thereof is connected to the second optical cable connector of the PCIe slot board unit 160.

The PCIe slot board unit 160 reconverts the converted optical signal into an electrical signal and outputs the electrical signal to the PCIe-based device 300. For this operation, as shown in FIG. 5, the PCIe slot board unit 160 includes a second optical cable female connector 161, a photoelectric converter 170, a PCIe downstream bridge 180, and a PCIe slot interface 190.

The second optical cable female connector 161 enables the optical cable 150 and the PCIe slot board unit 160 to be connected to each other.

The photoelectric converter 170 reconverts the converted optical signal into an electrical signal.

The PCIe downstream bridge 180 converts the reconverted electrical signal into packet data conforming to PCIe protocol standards. For this operation, as shown in FIG. 6, the PCIe downstream bridge 180 may include a photoelectric converter interface unit 181, a second data serialization unit 182, a second data parallelization unit 183, a second packet integrity processing unit 184, and a second data transmission unit 185.

The photoelectric converter interface unit 181 is connected to the photoelectric converter 170 to transmit packet data corresponding to the reconverted electrical signal. The second data parallelization unit 183 converts the packet data corresponding to the reconverted electrical signal into a parallel signal. The second packet integrity processing unit 184 guarantees the integrity of the packet data corresponding to the reconverted electrical signal. The second data transmission unit 185 is implemented using a data link layer 187 for adding CRC and sequence information to the packet data, the integrity of which has been guaranteed and which has been received from a transaction layer 186 and for transmitting the resulting packet data to a physical layer 188, in order to transmit the packet data corresponding to the reconverted electrical signal. The second data serialization unit 182 converts the packet data that has been converted into the parallel signal into a serial signal.

The PCIe downstream bridge 180 having the above construction is connected to the photoelectric converter 170 via the photoelectric converter interface unit 181. Since the signal of the photoelectric converter interface unit 181 is a serial signal, the PCIe downstream bridge 180 converts the serial signal into a parallel signal via the second data serialization unit 182 and the second data parallelization unit 183, and then the parallel signal is transmitted to and received from the second packet integrity processing unit 184. In this case, the transaction layer 186 receives an optically-interfaced packet data, the integrity of which has been verified by the second packet integrity processing unit 184, converts the packet data into the packet data of the transaction layer 186, and transmits the transaction layer packet data to the data link layer 187. Further, the transaction layer 186 optically interfaces the packet data of the transaction layer 186, received from the data link layer 187, and transmits the optically-interfaced packet data to the second packet integrity processing unit 184. In this case, the data link layer 187 adds CRC and sequence information to the transaction layer packet data received from the transaction layer 186, transmits the resulting packet data to the physical layer 188, processes the packet data of the data link layer 187 received from the physical layer 188, checks the integrity of the packet data of the transaction layer 186 received from the physical layer 188, and then transmits the integrity-checked packet data to the transaction layer 186.

The PCIe slot interface 190 is coupled to the PCIe slot male connector 301 of the PCIe-based device 300, thus enabling the PCIe slot board unit 160 and the PCIe-based device 300 to be connected to each other.

Figure 7:
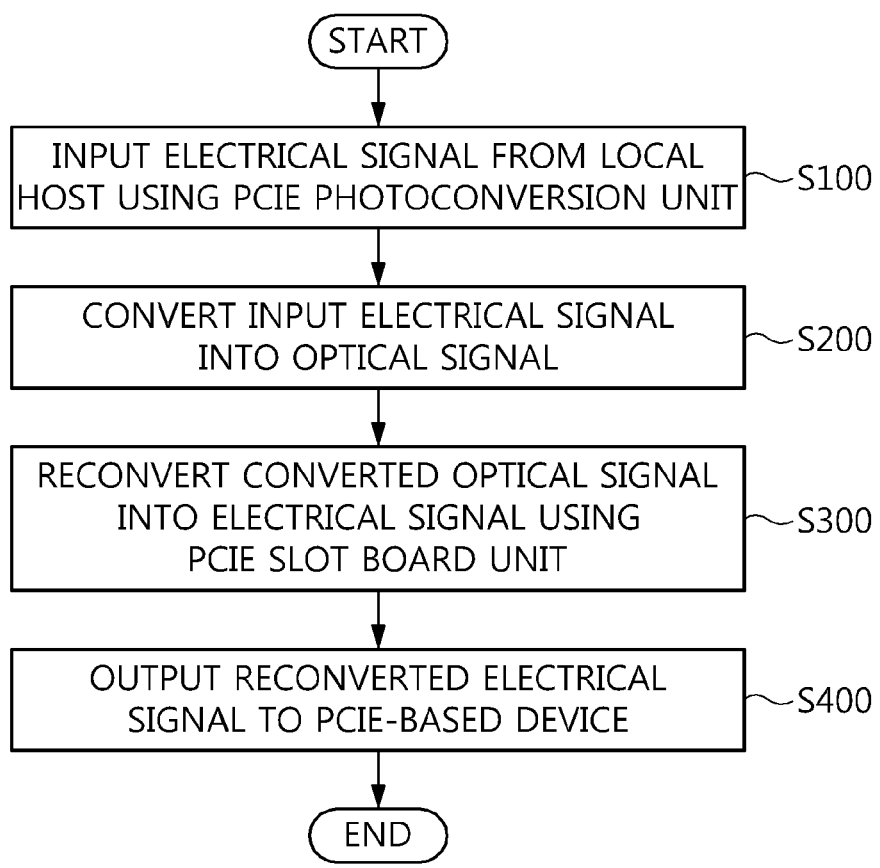
FIG. 7 is a flowchart showing a method of controlling the connection of the PCIe switch apparatus according to an embodiment of the present invention.

FIG. 7 is a flowchart showing a method of controlling the connection of the PCIe switch apparatus according to an embodiment of the present invention.

Referring to FIG. 7, in the method of controlling the connection of the PCIe switch apparatus according to the present invention, an electrical signal is input from the local host 200 by the PCIe photoconversion unit 110 provided in the PCIe switch apparatus 100 at step S100. Next, the PCIe photoconversion unit 110 converts the input electrical signal into an optical signal at step S200. In this case, the PCIe photoconversion unit 110 converts the input electrical signal into packet data conforming to PCIe protocol standards using the PCIe upstream bridge 120, and converts the packet data into the optical signal using the electro-optical converter 130.

Next, the optical signal is reconverted into an electrical signal by the PCIe slot board unit 160 connected to the PCIe photoconversion unit 110 via the optical cable 150 at step S300. In this case, the PCIe slot board unit 160 reconverts the converted optical signal into the electrical signal using the photoelectric converter 170, and converts the reconverted electrical signal into packet data conforming to PCIe protocol standards using the PCIe downstream bridge 180.

Thereafter, the PCIe slot board unit 160 outputs the reconverted electrical signal to the PCIe-based device 300, and then controls the connection between the local host 200 and the PCIe-based device 300 at step S400.

Below, the case where the local host 200 becomes a subject and performs a memory write operation on the PCIe-based device 300 by using the PCIe switch apparatus 100 having the above-described configuration and the case where the PCIe-based device 300 becomes a subject and performs a memory read operation on the local host 200 by using the PCIe switch apparatus 100, will be described.

First, the case where the local host 200 becomes a subject and performs a memory write operation on the PCIe-based device 300 by using the PCIe switch apparatus 100 will be described.

The local host 200 generates a PCIe memory write transaction ion via a PCIe slot female connector 201. This PCIe memory write transaction reaches the PCIe upstream bridge 120 via the PCIe slot male connector 111 of the PCIe photoconversion unit 110 of the PCIe switch apparatus 100. In this case, in the PCIe upstream bridge 120, the physical layer 122 receives the PCIe write transaction, and transmits the received PCIe memory write transaction to the data link layer 123. The data link layer 123 checks the integrity of the packet corresponding to the received PCIe memory write transaction, and transmits the packet to the transaction layer 124 if there is no error in the packet. The transaction layer 124 converts the packet into a format of packet data suitable for an optical interface, and then transmits the packet data to the first packet integrity processing unit 125. After the packet data converted in this way has been serialized by the first data serialization unit 126, the resulting serial signal is converted into an optical signal by the electro-optical converter 130 via the electro-optical converter interface unit 180. The optical signal generated by the electro-optical converter 130 reaches the photoelectric converter 170 via the second optical cable female connector 161 of the PCIe slot board unit 160 after passing through the first optical cable connector 140 and the optical cable 150. The photoelectric converter 170 converts the received optical signal into an electrical signal, and transmits the electrical signal to the PCIe downstream bridge 180. The electrical signal received via the photoelectric converter interface unit 181 is parallelized by the second data parallelization unit 183. The integrity of the resulting parallel signal is verified by the second packet integrity processing unit 184, after which the parallel signal is converted into PCIe packet data by the transaction layer 186. The data link layer 187 receives this packet data, adds CRC and sequence information to the packet data, and transmits the resulting packet data to the physical layer 188. The physical layer 188 is connected to the PCIe slot interface 190, and then a PCIe memory write packet is transmitted through the physical layer 188. The PCIe-based device 300 that received the PCIe memory write packet via the PCIe slot male connector 301 generates information indicating that the packet data has been received in the form of a packet for the data link layer 187, and transfers the packet to the PCIe downstream bridge 180 via the PCIe slot interface 190. Once the PCIe memory write packet has been transmitted to the PCIe downstream bridge 180, the function of guaranteeing the complete transmission/reception of the packet is an operation performed between the PCIe downstream bridge 180 and the PCIe-based device 300.

Next, the case where the PCIe-based device 300 becomes a subject and performs a memory read operation on the local host 200 by using the PCIe switch apparatus 100 will be described.

The PCIe-based device 300 generates a PCIe memory read transaction via the PCIe slot male connector 301. This PCIe memory read transaction reaches the PCIe downstream bridge 180 via the PCIe slot interface 190 of the PCIe slot board unit 160 of the PCIe switch apparatus 100. In this case, in the PCIe downstream bridge 180, the physical layer 188 receives the PCIe memory read transaction and transmits the received PCIe memory read transaction to the data link layer 187. The data link layer 187 checks the integrity of a packet for the received PCIe memory read transaction, and transmits the packet to the transaction layer 186 if there is no error in the packet. The transaction layer 186 converts the packet into a format of packet data suitable for an optical interface, and then transmits the packet data to the second packet integrity processing unit 184. The packet converted in this way is serialized by the second data serialization unit 182, and then the resulting serial signal is converted into an optical signal by the photoelectric converter 170 via the photoelectric converter interface unit 181. The optical signal generated by the photoelectric converter 170 reaches the electro-optical converter 130 via the second optical cable female connector 161, the optical cable 150, and the first optical cable connector 140 of the PCIe photoconversion unit 110. The electro-optical converter 130 converts the received optical signal into an electrical signal and transmits the electrical signal to the PCIe upstream bridge 120. The electrical signal received via the electro-optical converter interface unit 128 is parallelized by the first data parallelization unit 127, and the integrity of the resulting parallel signal is verified by the first packet integrity processing unit 125. Thereafter, the integrity-verified parallel signal is converted into PCIe packet data by the transaction layer 124. The data link layer 123 receives the packet data, adds CRC and sequence information to the packet data, and transmits the resulting packet data to the physical layer 122. The physical layer 122 is connected to the PCIe slot male connector 111, so that a PCIe memory read packet is transmitted via the PCIe slot male connector 111. The local host 200 that received the PCIe memory read packet via the PCIe slot male connector 111 generates information indicating that the packet has been received in the form of packet data for the data link layer 123, and transfers the packet data to the PCIe upstream bridge 120 via the PCIe slot interface 190. Once the PCIe memory read packet data has been transferred to the PCIe upstream bridge 120, the function of guaranteeing the complete transmission/reception of the memory read packet is an operation performed between the PCIe upstream bridge 120 and the local host 200.

The local host 200 that completely received the memory read packet generates a PCIe memory read completion transaction via the PCIe slot female connector. This PCIe memory read completion transaction reaches the PCIe upstream bridge 120 via the PCIe slot male connector 111 of the PCIe photoconversion unit 110 of the PCIe switch apparatus 100. In the PCIe upstream bridge 120, the physical layer 122 receives the PCIe memory read completion transaction, and transmits the received PCIe memory read completion transaction to the data link layer 123. The data link layer 123 checks the integrity of a packet for the received PCIe memory read completion transaction, and transmits the packet to the transaction layer 124 if there is no error in the packet. The transaction layer 124 converts the packet into a format of packet data suitable for an optical interface, and then transmits the packet data to the first packet integrity processing unit 125. After the packet data converted in this way has been serialized by the first data serialization unit 126, the resulting serial signal is converted into an optical signal by the electro-optical converter 130 via the electro-optical converter interface unit 128. The optical signal generated by the electro-optical converter 130 reaches the photoelectric converter 170 via the first optical cable connector 140, the optical cable 150, and the second optical cable female connector 161 of the PCIe slot board unit 160. The photoelectric converter 170 converts the received optical signal into an electrical signal and transmits the electrical signal to the PCIe downstream bridge 180. The electrical signal received via the photoelectric converter interface unit 181 is parallelized by the second data parallelization unit 183. The integrity of the resulting parallel signal is verified by the second packet integrity processing unit 184, and thereafter the integrity-verified parallel signal is converted into PCIe packet data by the transaction layer 186. The data link layer 187 receives the packet data, adds CRC and sequence information to the packet data, and transmits the resulting packet data to the physical layer 188. Sine the physical layer 188 is connected to the PCIe slot interface 190, a PCIe memory read completion packet is transmitted via the PCIe slot interface 190. The PCIe-based device 300 that received the PCIe memory read completion packet via the PCIe slot male connector 301 generates information indicating that the packet has been received in the form of a packet for the data link layer 187, and transfers the data link layer packet to the PCIe downstream bridge 180 via the PCIe slot interface 190. Once the PCIe memory read completion packet has been transferred to the PCIe downstream bridge 180, the function of guaranteeing the complete transmission/reception of the packet is an operation performed between the PCIe downstream bridge 180 and the PCIe-based device 300.

In this way, the PCIe switch apparatus and the method of controlling the connection thereof according to the present invention enable the conversion between an electrical signal and an optical signal to be performed within the PCIe switch apparatus 100 so as to control a connection between the local host 200 and the PCIe-based device 300, thus enabling connection control, such as for the sensing of a receiver and the change of a signal level that are required by PCIe protocol standards, to be implemented. Further, the present invention prevents the PCIe switch apparatus 100 from being duplicated and used, thus minimizing a waste of resources and eliminating a delay time.

As described above, the PCIe switch apparatus and the method of controlling the connection thereof are advantageous in that conversion between an electrical signal and an optical signal is performed within the PCIe switch apparatus so as to control a connection between a local host and a PCIe-based device, thus enabling connection control, such as for the sensing of a receiver and the change of a signal level that are required by PCIe protocol standards, to be implemented.

Further, the present invention is advantageous in that it prevents duplicate PCIe switches from being used, thus minimizing a waste of resources and eliminating a delay time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Peripheral Component Interconnect Express (PCIe) switch apparatus, comprising:
    a PCIe photoconversion unit for converting an electrical signal input from a local host into packet data suitable for an optical interface and converting the converted packet data into an optical signal;
    a PCIe slot board unit for reconverting the optical signal into the packet data, reconverting the packet data into the electrical signal, and outputting the electrical signal to a PCIe-based device; and
    an optical cable for connecting the PCIe photoconversion unit and the PCIe slot board unit to each other,
    wherein the PCIe switch apparatus controls a long-distance communication interface between the local host and the PCIe-based device,
    wherein the PCIe photoconversion unit comprises:
    a PCIe upstream bridge for converting the input electrical signal into the packet data; and
    an electro-optical converter for converting the packet data into the optical signal,
    wherein the PCIe upstream bridge comprises:
    a first data transmission unit configured to transmit the packet data;
    a first packet integrity processing unit configured to verify an integrity of the packet data;
    a first data serialization unit configured to convert the packet data, the integrity of which has been verified, into a serial signal;
    an electro-optical converter interface unit connected to the electro-optical converter and configured to transmit the packet data that has been converted into the serial signal; and
    a first data parallelization unit configured to convert the packet data that has been converted into the serial signal into a parallel signal.

2. The PCIe switch apparatus of claim 1, wherein the PCIe slot board unit comprises:
    a photoelectric converter for reconverting the converted optical signal into the electrical signal; and
    a PCIe downstream bridge for converting the reconverted electrical signal into the packet data conforming to PCIe protocol standards.

3. The PCIe switch apparatus of claim 2, wherein the PCIe downstream bridge comprises:
    a photoelectric converter interface unit connected to the photoelectric converter and configured to transmit the packet data corresponding to the reconverted electrical signal;
    a second data parallelization unit configured to convert the packet data corresponding to the reconverted electrical signal into a parallel signal;
    a second packet integrity processing unit configured to verify integrity of the packet data corresponding to the reconverted electrical signal;

a second data transmission unit configured to transmit the packet data corresponding to the reconverted electrical signal; and a second data serialization unit configured to convert the packet data that has been converted into the parallel signal into a serial signal.

4. A method of controlling a connection of a Peripheral Component Interconnect Express (PCIe) switch apparatus, comprising:

a PCIe photoconversion unit, provided in the PCIe switch apparatus, converting an electrical signal input from a local host into packet data suitable for an optical interface and converting the packet data into an optical signal; and a PCIe slot board unit, connected to the PCIe photoconversion unit via an optical cable, reconverting the optical signal into the packet data, reconverting the packet data into the electrical signal, and outputting the electrical signal to a PCIe-based device, wherein the method controls a communication interface between the local host and the PCIe-based device, wherein the converting the packet data into the optical signal is configured such that the PCIe photoconversion unit converts the input electrical signal into the packet data by using a PCIe upstream bridge and converts the packet data into the optical signal by using an electro-optical converter.

5. The method of claim 4, wherein the reconverting the packet data into the electrical signal and outputting the electrical signal to the PCIe-based device is configured such that the PCIe slot board unit reconverts the converted optical signal into the electrical signal by using a photoelectric converter, and converts the reconverted electrical signal into packet data by using a PCIe downstream bridge.

* * * * *